United States Patent

[11] 3,608,809

[72] Inventor Robert Holbrook Cushman
 Princeton, N.J.
[21] Appl. No. 753,230
[22] Filed Aug. 16, 1968
[45] Patented Sept. 28, 1971
[73] Assignee Western Electric Company, Incorporated
 New York, N.Y.

[54] APPARATUS FOR UNIFORM MULTIPLE-LEAD BONDING
 15 Claims, 17 Drawing Figs.

[52] U.S. Cl. .................................................. 228/44,
 29/471.1, 29/475, 156/73, 228/1, 228/4, 269/263, 269/266
[51] Int. Cl. ............................................. B23k 19/00
[50] Field of Search ........................................ 228/1, 3, 4,
 6, 44; 269/22, 263, 266; 29/470.1, 471.1, 475;
 156/73, 480, 498

[56] References Cited
 UNITED STATES PATENTS

| | | | |
|---|---|---|---|
| 1,453,176 | 4/1923 | Perrine | 269/266 |
| 1,872,692 | 8/1932 | Drake | 269/22 |
| 2,040,466 | 5/1936 | Christy | 269/22 X |
| 2,960,147 | 11/1960 | Ferrell | 156/498 |
| 3,433,413 | 3/1969 | Berleyoung et al. | 156/73 X |
| 3,440,117 | 4/1969 | Soloff et al. | 29/470.3 X |
| 3,448,911 | 6/1969 | Cushman | 228/44 |
| 3,483,611 | 12/1969 | Balamuth et al. | 228/1 X |
| 3,547,599 | 12/1970 | Muser et al. | 29/491 |

FOREIGN PATENTS

| 388,891 | 1933 | Great Britain | 269/22 |
|---|---|---|---|

Primary Examiner—John F. Campbell
Assistant Examiner—Robert J. Craig
Attorneys—H. J. Winegar, R. P. Miller and W. M. Kain ABSTRACT: A viscous medium such as a heavy grease or molten solder is sealed in a chamber by a diaphragm to provide a compensating bonding tip and/or a compensating base. As bonding pressure is applied to a workpiece to bond a plurality of leads to selected bonding sites on the workpiece, the diaphragm flexes to compensate for workpiece irregularities and the viscous medium distributes the bonding pressure across the diaphragm to apply uniform bonding pressure at each bonding site. Bonding and/or supporting pads may be carried by the diaphragm to facilitate the application of pressure to a desired site.

Alternatively, a ductile material is confined in a chamber and an apertured plate is employed to locate and retain a plurality of pins at desired positions on the ductile material. The pins and plate cooperate to confine the ductile material to the chamber and the pins are employed to apply bonding pressure to selected bonding sites on a workpiece and/or to support selected areas of the workpiece. The pins are independently displaceable to compensate for workpiece irregularities and the confined ductile material hydraulically interconnects the pins to uniformly distribute the bonding pressure to the pins.

Alternatively, the resiliency of the pins is employed to provide compensation for workpiece irregularities or the pins are mounted on a resilient mat to provide such compensation.

PATENTED SEP 28 1971　　3,608,809

INVENTOR
R. H. CUSHMAN

BY W. L. Williamson
ATTORNEY

APPARATUS FOR UNIFORM MULTIPLE-LEAD BONDING

STATEMENT OF THE PROBLEM

Reliable lead bonding on a mass production basis has always been of great importance in the communication industry, but with the advent of thin-film and integrated circuits, reliable lead bonding on a mass production basis has become increasingly difficult.

For example, thin-film and integrated circuits are commonly manufactured on relatively fragile substrates such as glass, ceramic, silicon or germanium. If bonding pressure is not applied uniformly to each bonding site, the bonds are not uniform and the resulting stress on the substrate may result in substrate damage. For example, workpiece irregularities such as variations in lead thickness, land area thickness, lack of parallelism, substrate warpage and substrate waviness, result in leads not lying in a common plane and/or in the common plane of the leads not being in parallel with a bonding surface of a bonding tip. Or, in other words, the leads will not have the same height with respect to the bonding surface. As a result, the application of bonding pressure to the leads by applying the bonding surface of the bonding tip to the leads, may cause excessive pressure to be applied to some leads and insufficient pressure to be applied to other leads. Excessive bonding pressure may result in damaged leads and/or substrates and insufficient pressure may result in a poor bond or no bond.

SUMMARY OF THE INVENTION

It is, therefore, an object of this invention to simultaneously bond multiple leads without workpiece damage.

An additional object of this invention is to apply a uniform bonding pressure to a plurality of leads.

Another object of this invention is to apply a uniform bonding pressure to a plurality of leads while compensating for workpiece irregularities.

With these and other objects in view, this invention contemplates providing facilities for engaging and/or supporting each bonding site wherein said facilities are independently displaceable at each bonding site so as to compensate for workpiece irregularities. In addition facilities are provided for distributing bonding pressure equally at each bonding site.

DETAILED DESCRIPTION

A complete understanding of the invention may be had by reference to the drawings when taken in conjunction with the following detailed description.

With reference to FIGS. 1–5, the effects of irregularities of a workpiece 21 on the simultaneously bonding of multiple leads will be discussed. Examples of such irregularities are variations in lead thickness, variations in land area thickness, lack of parallelism between the substrate and bonding tool, substrate waviness substrate warpage.

Figure 1:
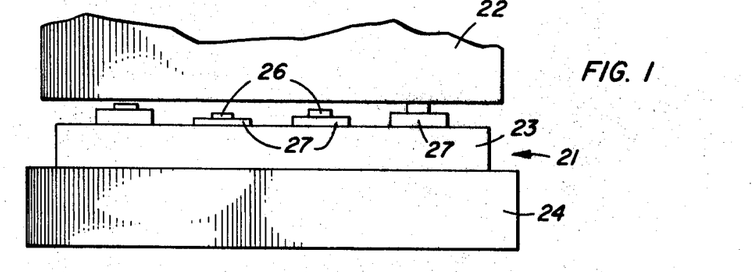
FIGS. 1–5 illustrate the effects of workpiece irregularities such as variations in lead and/or land area thickness (FIGS. 1 and 2), lack of parallelism (FIG. 3), substrate waviness (FIG. 4) and substrate warpage (FIG. 5) on the simultaneous bonding of multiple leads.
Figure 2:
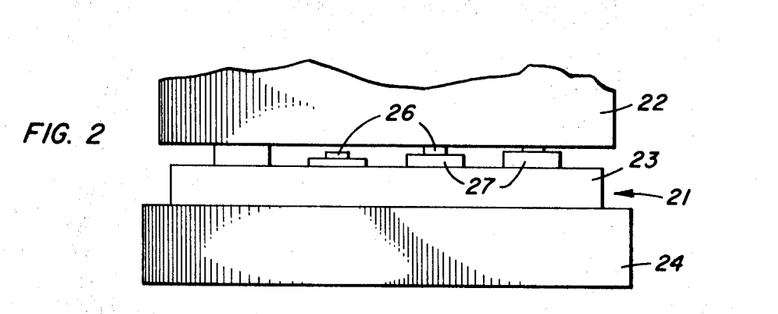

The effect of variations in lead and/or land area thickness may be seen FIGS. 1 and 2. For example, as a bonding tip 22 is displaced towards a substrate 23 which is supported on a base 24 to bond a plurality of leads 26—26 to corresponding bonding sites such as land areas 27—27 on the substrate 23, the bonding tip 22 does not simultaneously engage each of the leads 26—26 because some leads are higher than others. As seen in FIG. 2, when the bonding tip 22 completes its displacement towards the substrate 23, excessive pressure is applied to some leads while insufficient pressure is applied to other leads. This may result in some leads being weakened due to excessive deformation of the leads or in other leads not being bonded or only poorly bonded due to insufficient bonding pressure being applied. In other words, nonuniform bonding may result.

Figure 3:
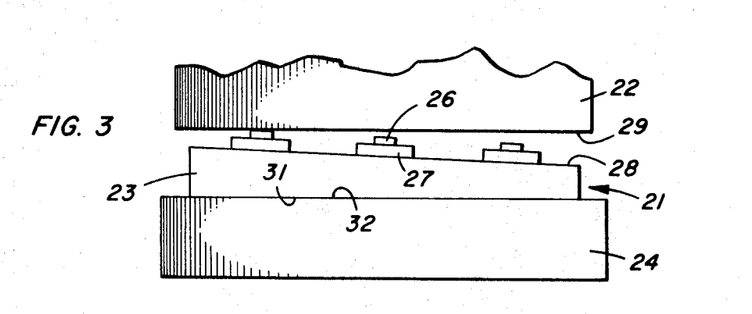

The effect of a lack of parallelism between a major surface 28 of the substrate 23 and bonding surface 29 of the bonding tip 22 may be seen from FIG. 3. Such a lack of parallelism results in the bonding tip 22 applying unequal bonding forces to the leads 26—26. This may result in either excessive deformation of some leads and/or in insufficient pressure being applied to other leads and, therefore, in nonuniform bonding. In addition, excessive pressure applied to a localized area of substrate 23 may result in substrate damage such as substrate fracturing. This lack of parallelism may result because major surface 31 of the substrate 23 is not parallel to surface 28 and/or because surface 32 of base 24 is not parallel to surface 29 of the bonding tip.

Figure 4:
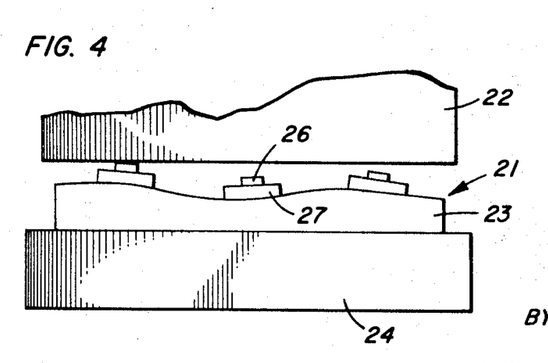

The effect of substrate waviness may be seen from FIG. 4. As a result of such substrate waviness, the leads 26—26 do not lie in a common plane. Consequently, the bonding tip 22 does not apply uniform bonding forces to each lead 26—26. This may result in excessive deformation of some leads and/or in insufficient pressure being applied to other leads and, therefore, in nonuniform bonding. In addition, excessive pressure applied to a localized area of substrate 23 may result in substrate damage such as substrate fracturing.

Figure 5:
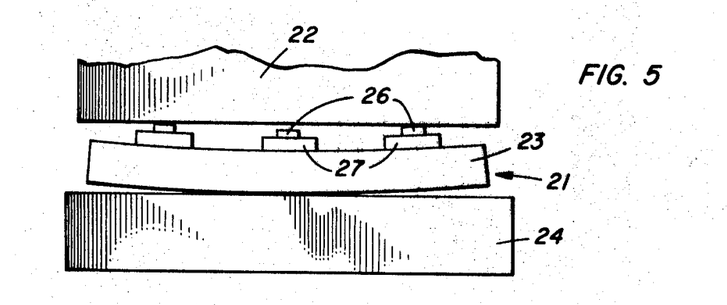

The effect of substrate warpage may be seen from FIG. 5. As a result of such substrate warpage, the leads 26—26 do not lie in a common plane. Consequently, the bonding tip 22 does not apply equal bonding forces to each lead 26—26. This may result in excessive deformation of some leads and/or in insufficient pressure being applied to other leads and, therefore, in nonuniform bonding. In this situation, however, the pressure at which the bonding tip 22 is applied is usually sufficient to flatten the substrate against the base 24 thereby eliminating the effect of warpage from the bonding operation. Unfortunately, this may also fracture the substrate.

As will be appreciated, variations in lead thickness, variations in land area thickness, lack of parallelism, substrate waviness, and substrate warpage are only examples of the various types of workpiece irregularities which may result in nonuniform bonding. In general, without compensation for workpiece irregularities, uniform bonding is not possible unless all of the leads lie in a common plane and the common plane of the leads lies parallel to the bonding surface of the bonding tip. As a result, any workpiece irregularities which introduce any substantial nonparallelism between the common plane of the leads and the bonding surface of the bonding tip or which introduce any substantial displacement of one or more leads out of the common plane of the leads, will cause nonuniform bonding unless compensated for.

Figure 6:
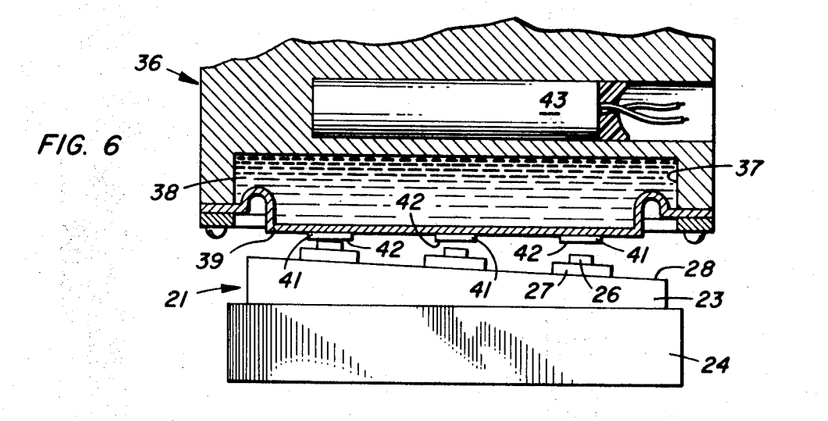
FIGS. 6 and 7 illustrate a compensating bonding tip constructed according to the concepts of this invention for applying uniform bonding pressure to each bonding site while compensating for workpiece irregularities.
Figure 7:
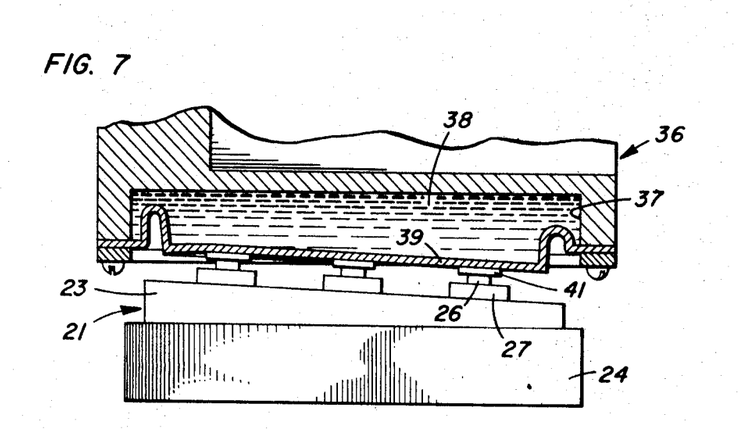

Referring now to FIGS. 6 and 7, a compensating bonding tip 36 may be advantageously employed to compensate for workpiece irregularities which interfere with uniform bonding. The compensating tip 36 is advantageously provided with a chamber 37 filled with a viscous medium 38 such as molten solder. The chamber 37 is sealed by a diaphragm 39 and the diaphragm may be advantageously provided with a plurality of bonding pads 41—41. A bonding pad 41 is associated with each lead 26 to be bonded so that upon displacement of the bonding tip 36 into engagement with the leads 26—26, the bonding pads 41—41 move independently to compensate for workpiece irregularities.

When a bonding pad 41 engages a lead 26 which is higher than the other leads, for example, the lead on the far left in FIGS. 6, the bonding pad 41 is displaced into the viscous medium 38 by flexing the diaphragm 39 so as to compensate for the excess height of the lead, for example, as shown in FIG. 7. The particular type of workpiece irregularity illustrated in FIGS. 6 and 7 is lack of parallelism between surface 28 (FIG. 6) of substrate 23 and bonding surfaces 42—42 (FIG. 6) of bonding pads 41—41. However, the compensating bonding tip 36 also compensates for other types of workpiece irregularities such as variations in lead thickness and/or land area thickness and waviness of surface 28. As each lead is provided with a discrete bonding pad, each bonding pad is individually displaceable to adjust for variations in height of the lead with respect to the other leads due to the common plane of the leads not being parallel to the bonding surfaces 42—42 or due to the leads not all lying in the same plane. In addition, the viscous medium 38 distributes the pressure across the diaphragm 39 so that substantially the same pressure is applied to each lead. In this manner, uniform bonding conditions are maintained at each lead irrespective of workpiece irregularities. It should be noted that the bonding pads 41—41 are not essential and the diaphragm itself may be employed to apply the desired pressure to the leads. However, if leads extending from a second workpiece such as a beam lead device are to be bonded to the land areas 27—27, the pads 41—41 may be advantageously employed to give sufficient clearance to avoid applying undesirable pressure to the second workpiece.

As will be appreciated, the compensating bonding tip 36 may be employed with any suitable bonding process to obtain a uniform bond at each lead while compensating for workpiece irregularities and may be displaced into engagement with a workpiece in any suitable manner such as with a conventional air cylinder (not shown). For example, the bonding tip 36 may be employed with ultrasonic, thermocompression, or mechanical thermal-pulse bonding. A heavy grease may be advantageously employed for the viscous medium 38 when it is not desired to heat the bonding tip 36. For example, in thermocompression bonding the workpiece may be heated but not the bonding tip and in ultrasonic bonding the bonding tip is not usually heated. If it is desired to employ a heated bonding tip, molten solder may advantageously be employed as the viscous medium. For example, in elevated temperature ultrasonic bonding, thermocompression bonding and mechanical thermal-pulse bonding, the bonding tip is usually heated. When the viscous medium 38 is molten solder, a heating element 43 such as a conventional cartridge type heater may be employed to maintain the solder at the desired temperature.

Figure 8:
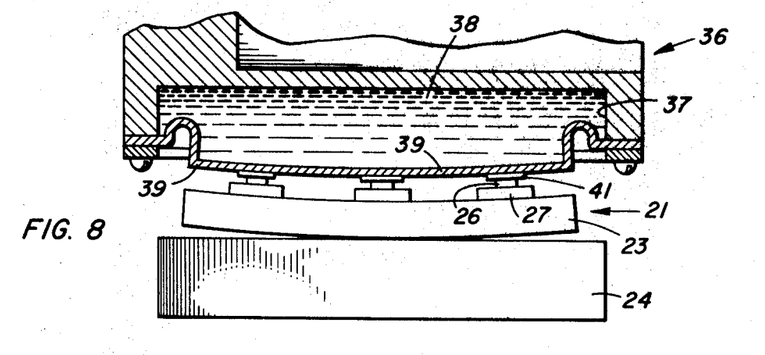
FIGS. 8 and 9 illustrate the difficulties encountered in applying uniform bonding pressure to each bonding site without workpiece damage when the workpiece irregularity is substrate warpage.
Figure 9:
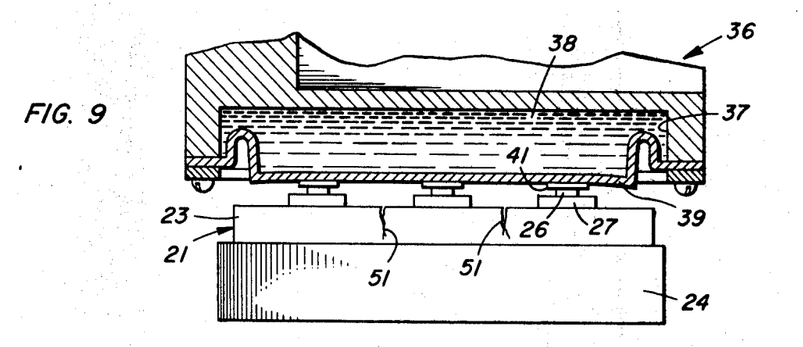

Referring now to FIGS. 8 and 9, it will be noted that the compensating bonding tip 36 can readily compensate for variations in the height of the leads 26—26 due to substrate warpage (FIG. 8). However, at the bonding pressure usually employed the substrate 23 will be flattened against the base 24 thereby effectively eliminating the effect of substrate warpage from the bonding process (FIG. 9). Unfortunately, if too much flexing of the substrate results at the bonding pressures employed, the substrate will fracture, for example, at lines 51—51, and ruin the workpiece. Therefore, in those instances where excessive flexing does not occur during bonding, the compensating tip 36 will compensate for variations in the height of the leads due to substrate warpage and will permit a uniform bond at each lead to be obtained without fracturing the substrate. However, if substrate warpage is excessive and sufficient pressure is applied during bonding to fracture the substrate, compensation for variations in the height of the leads by the compensating bonding tip is not of great practical value.

Figure 10:
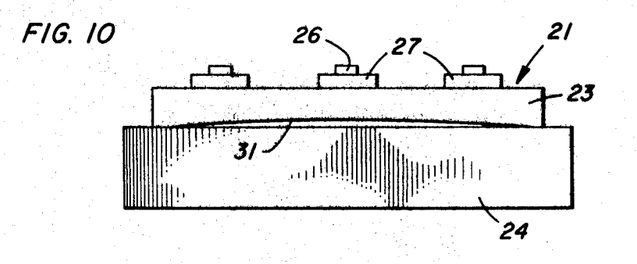
FIGS. 10 and 11 illustrate the difficulties encountered in applying uniform bonding pressures to each bonding site without workpiece damage when the workpiece irregularity is waviness of the bottom surface of the substrate.
Figure 11:
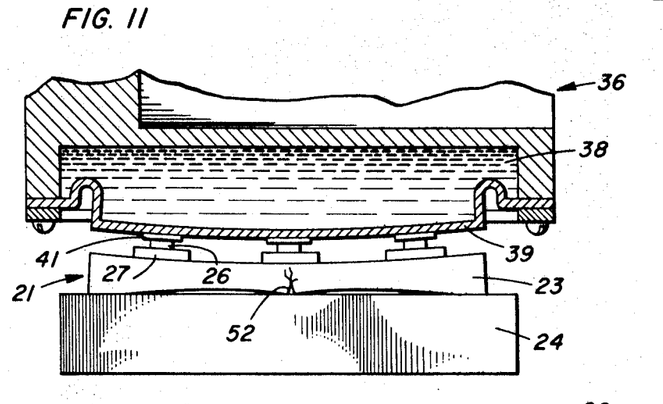

In addition, when, as shown in FIGS. 10 and 11 the workpiece irregularity is waviness of surface 31 of substrate 23 (FIG. 9), the compensating bonding tip 36 compensates for any resulting variations in the height of the leads 26—26, but the substrate is also fixed during the bonding process (FIG. 10). If the flexing of the substrate is too great, fracturing will result, for example, at line 52, thereby ruining the workpiece.

Figure 12:
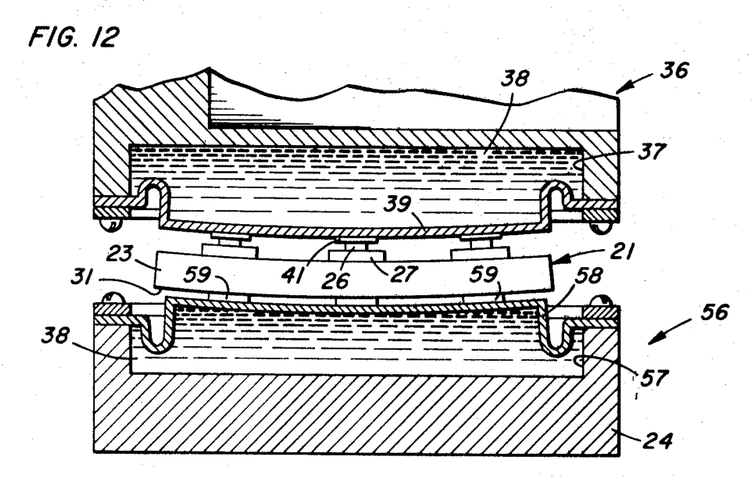
FIG. 12 illustrates a compensating base constructed according to the concepts of this invention employed with the compensating bonding tip of FIGS. 6–11.

Referring now to FIG. 12 a compensating base 56 may advantageously be employed with the compensating bonding tip 36 to permit compensation for workpiece irregularities introduced by substrate warpage or waviness of surface 31 without fracturing the substrate. The compensating base 56 is advantageously provided with a chamber 57 filled with viscous medium 38 such as a heavy grease. The chamber 57 is sealed by a diaphragm 58 and a plurality of supporting pads 59—59 are carried by the diaphragm 58. As the bonding tip 36 is displaced into engagement with the workpiece 21, the substrate is urged against the supporting pads 59—59 to force the pads into the viscous medium 38 by flexing the diaphragm 58. As a result, the diaphragm 58 conforms to the configuration of the surface 31 of the substrate 23, the pads 59—59 apply supporting pressure at each land area 27—27 and the viscous medium distributes the pressure across the diaphragm 58 so that substantially the same pressure is applied to each lead 26—26 at each land area 27—27. In this manner, the compensating bonding tip 36 and the compensating base 56 compensate for substrate warpage and/or waviness of surface 31 without flexing the substrate while also compensating for any variation in the height of the leads.

It should be noted that if the leads 26—26 lie in substantially the same plane, lack of parallelism between the plane of the leads and the bonding tip may be compensated for by the compensating base 56 without employing the compensating bonding tip 36. In addition, waviness of surface 31 may also be compensated for by the compensating base without employing the compensating bonding tip. Accordingly, in many bonding situations, uniform bonds may be obtained by employing the compensating base alone.

The compensating bonding tip and/or compensating base may also be advantageously employed in compliant bonding. In complaint bonding, a compliant medium is employed as the bonding medium and the compliant medium compensates for many workpiece irregularities, see the A. Coucoulas application Ser. No. 651,411 filed July 6, 1967. However, the compensating base 56 may be advantageously employed with compliant bonding to facilitate the compensation for workpiece irregularities such as waviness of surface 31 and substrate warpage. In addition, the compensating bonding tip may also be employed without the bonding pads 41—41 to facilitate the equal distribution of the bonding pressure across the compliant medium.

Figure 13:
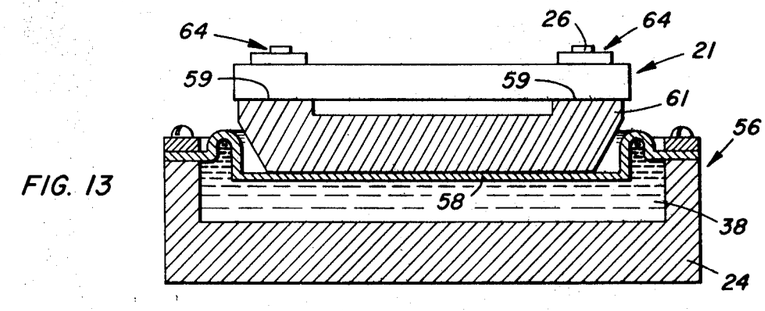
FIGS. 13 and 14 illustrate two different embodiments of the compensating base of FIG. 12 wherein pontoons and pins respectively are used to support each bonding site.
Figure 14:
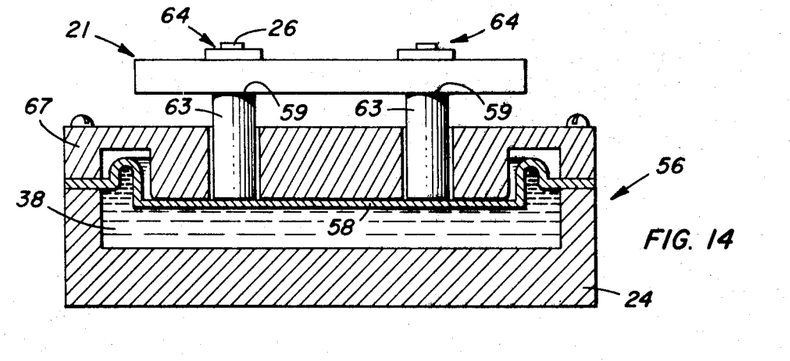

The bonding pads 41—41 and the supporting pads 59—59 are advantageously employed when the leads to be bonded are extremely small such as in beam-lead bonding. In such cases, the bonding pads and supporting pads may be advantageously formed directly on the diaphragm in any suitable manner such as etching. When the leads to be bonded are larger, appropriately sized pins or pontoons may be supported on the diaphragm to provide the desired bonding or supporting pads. For example, as seen in FIGS. 13 and 14, pontoons such as pontoon 61 may be supported on diaphragm 58 (FIG. 13) or pins 63—63 may be supported on the diaphragm 58 (FOG.

14) to provide supporting pads 59—59 of the compensating base 56. When pontoons such as pontoon 61 are employed (FIG. 13) a single pontoon is advantageously used for each pair of bonding sites 64—64, and when pins 63—63 are employed, a suitably apertured plate 67 is advantageously employed (FIG. 14) for locating and retaining a pin 63 at each bonding site 64. As will be appreciated, the pontoon and pin arrangement may also be employed for the compensating bonding tip 36.

Figure 15:
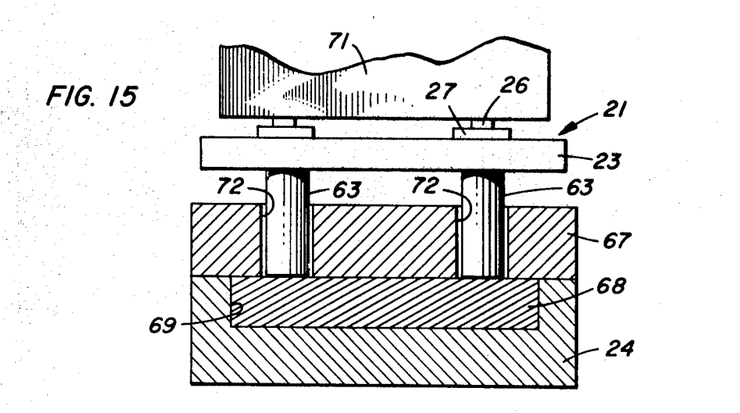
FIG. 15 illustrates still another embodiment of the compensating base wherein a ductile material is employed to hydraulically couple a plurality of pins to equally distribute bonding pressure to each pin.

In the embodiment of FIG. 15, the diaphragm 58 is eliminated by employing a ductile material 68 instead of a viscous medium. The ductile material 68 is confined in the base 24 by chamber 69 and the pins 63—63 are located and retained in the desired position by the apertured plate 67. The ductile material is preferably a ductile nonwork-hardening metal such as aluminum, indium, lead, tin and zinc, but other materials such as "Teflon" may also be employed. The pins 63—63 are directly in contact with the ductile material 68 and compress the material to compensate for workpiece irregularities in response to a bonding tip 71 being applied to substrate 23 to bond leads 26—26 to land areas 27—27. In addition, by providing a sufficiently close tolerance between the apertures 72—72 of the aperture plate 67 and the pins 63—63 to prohibit escape of the ductile material 68 and by confining the material 68 within the chamber 69, the material acts as a fluid and hydraulically couples the pins 63—63 together to equalize the pressure at each pin. It is emphasized, however, that the material 68 is not a fluid but rather acts as a fluid.

Figure 16:
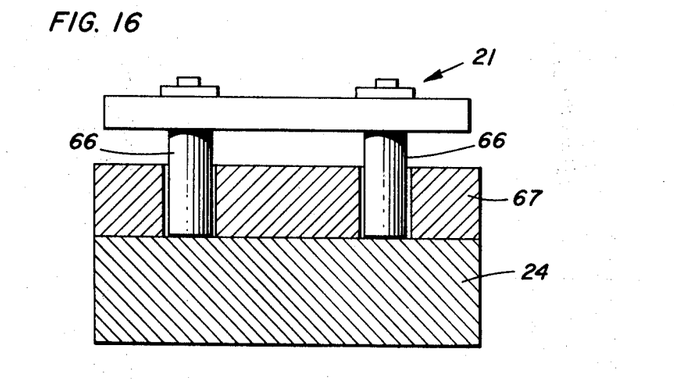
FIG. 16 illustrates still another embodiment wherein the resiliency of a plurality of supporting pins is employed to compensate for workpiece irregularities.

In addition, in some bonding applications, the diaphragm viscous medium or ductile material may be eliminated. For example, with reference to FIG. 16, workpiece irregularities may be compensated for by employing the resiliency of the supporting pads 59—59. For example, if pins 63—63 are relatively long, for example, 1 inch long and relatively narrow, for example, 1/32 inch in diameter, the pins may be compressed 1 to 2 mils with relatively small forces being applied thereto and without deforming the pins. Accordingly, if the workpiece irregularities in a given bonding application do not result in variations in lead height greater than 1 to 2 mils, effective compensation may be obtained without the diaphragm, viscous medium of ductile material. It should be noted that in this embodiment the bonding forces will not be distributed equally to each pin. However, if the force required to compress a given pin within the elastic limits of the pin so as to obtain compensation is relatively small as compared to the required bonding pressures, acceptably uniform bonds may be obtained.

Figure 17:
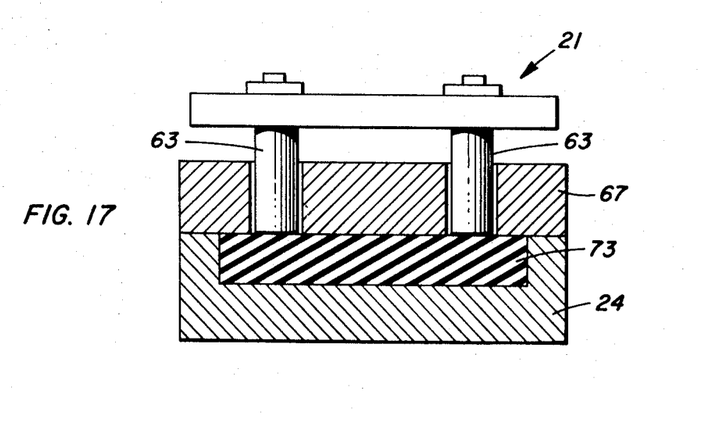
FIG. 17 illustrates still another embodiment wherein a resilient mat is employed to support a plurality of pins to permit individual displacement of the pin to compensate for workpiece irregularities.

Referring now to FIG. 17, pins 63—63 are supported on a resilient mat 73 such as neoprene rubber. In this embodiment the pins 63—63 are displaced into the resilient mat 73 to compensate for workpiece irregularities. It should be noted that, as in the embodiment of FIG. 16, this embodiment dies not distribute the bonding forces equally to each pin. However, if the force required to compress the resilient mat 73 so as to obtain compensation is relatively small as compared to the required bonding pressure, acceptably uniform bonds may be obtained.

Although the embodiments of FIGS. 13–17 have been discussed primarily with reference to compensating bases, it is to be understood that these embodiments may be employed as compensating bonding tips with suitable modificatons. In addition, it is to be understood than any one of these compensating bonding tips may be employed without a compensating base in many instances and that any one of the compensating bases may be employed without a compensating bonding tip in many instances. In addition, any one of the compensating bonding tips may be employed with any one of the compensating bases.

What I claim is:

1. An apparatus for uniformly bonding a plurality of leads to associated bonding sites on at least one major surface of a workpiece without damage to the workpiece said workpiece having a major surface on two opposite sides of said workpiece, said apparatus comprising:
    means for engaging one of the major surfaces;
    a plurality of pads positioned at each bonding site for engaging the other major surface of said workpiece, said pads being individually displaceable to compensate for workpiece irregularities upon engagement of said means for engagement and said pads with said major surfaces to apply bonding pressure to the leads at said bonding sites; and
    means associated with said pads for distributing said bonding pressure equally to each of said pads to uniformly bond said leads to their associated bonding sites without workpiece damage.

2. The apparatus of claim 1 wherein said means for distributing said bonding pressure to said bonding pads is a viscous medium sealed in a chamber by a diaphragm.

3. The apparatus of claim 2 wherein said viscous medium is a heavy grease.

4. The apparatus of claim 3 wherein said means for engaging one of the major surfaces is a bonding tip.

5. The apparatus of claim 4 wherein said pads are pins.

6. The apparatus of claim 4 wherein each pair of said pads is a pontoon.

7. The apparatus of claim 2 wherein said viscous medium is molten solder.

8. The apparatus of claim 7 wherein said means for engaging one of the major surfaces is a supporting base.

9. The apparatus of claim 8 wherein said pads are pins.

10. The apparatus of claim 8 wherein each pair of said pads is a pontoon.

11. The apparatus of claim 1 wherein said means for distributing said bonding pressure to said bonding pads is a ductile material contained in a chamber, said pads are pins which directly engage said ductile material and an apertured plate which located and retains said pins with respect to said ductile material cooperates with said pins to seal said ductile material in said chamber, said ductile material acting as a fluid to equally distribute said bonding pressure to each bonding site.

12. The apparatus of claim 11 wherein said means for engaging one of the major surfaces is a bonding tip.

13. The apparatus of claim 11 wherein said means for engaging one of the major surfaces is a supporting base.

14. An apparatus for bonding a plurality of leads to associated bonding sites on one major surface of a workpiece without damage to the workpiece, said workpiece having a major surface on two opposite sides of said workpiece said apparatus comprising:
    a plurality of pins for engaging one major surface of the workpiece, each of said pins engaging said major surface opposite a bonding site on the other major surface; and
    a bonding tip for applying pressure to each lead to bond the leads to their associated bonding sites, the bonding pressure compressing said pins within their elastic limits to compensate for workpiece irregularities.

15. An apparatus for bonding a plurality of leads to associated bonding sites on one major surface of a workpiece without damage to the workpiece, said workpiece, said workpiece having a major surface on two opposite sides of said workpiece, said apparatus comprising:
    a resilient mat;
    a plurality of pins supported on said resilient mat for engaging one major surface of the workpiece, each of said pins engaging said major surface opposite a bonding site on the other major surface; and
    a bonding tip for applying bonding pressure to each lead to bond the leads to their associated bonding sites, the bonding pressure displacing said pins into said resilient mat to compensate for workpiece irregularities.

PO-1050
(5/69)

UNITED STATES PATENT OFFICE
CERTIFICATE OF CORRECTION

Patent No. 3,608,809  Dated September 28, 1971

Inventor(s) ROBERT HOLBROOK CUSHMAN

It is certified that error appears in the above-identified patent and that said Letters Patent are hereby corrected as shown below:

In the specification, Column 2, line 12, "simultaneously" should read --simultaneous--. Column 4, line 16, "fixed" should read --flexed--. Column 4, line 75, "FOG." should read --FIG.---. Column 5, line 25, "material acts" should read --material 68 acts--. Column 5, line 29, "diaphragm" should read --diaphragm,--. Column 5, line 41, "of" should read --or--. Column 5, line 52, "dies" should read --does--. Column 5, line 56, "pressure" should read --pressures--.

In the claims, column 6, line 37, "located" should read --locates--. Column 6, line 53, after the word "applying" insert --bonding--. Column 6, line 59, delete "said workpiece," (first occurrence).

Signed and sealed this 21st day of March 1972.

(SEAL)
Attest:

EDWARD M. FLETCHER, JR.  ROBERT GOTTSCHALK
Attesting Officer  Commissioner of Patents

Disclaimer 3,608,809.—*Robert Holbrook Cushman*, Princeton, N.J. APPARATUS FOR UNIFORM MULTIPLE-LEAD BONDING. Patent dated Sept. 28, 1971. Disclaimer filed Jan. 24, 1972, by the assignee, *Western Electric Company, Incorporated.*

Hereby enters this disclaimer to claims 11, 12, 13 and 15 of said patent.

[*Official Gazette June 13, 1972.*]